United States Patent [19]

Burckhardt et al.

[11] Patent Number: 4,539,035
[45] Date of Patent: Sep. 3, 1985

[54] METHOD AND APPARATUS FOR IMPROVING OXYGEN BURNER PERFORMANCE IN A GLASS FURNACE

[75] Inventors: Klaus A. Burckhardt, Spring City; Jules C. Blessing, Southampton, both of Pa.

[73] Assignee: Messer Griesheim Industries, Inc., Valley Forge, Pa.

[21] Appl. No.: 593,540

[22] Filed: Mar. 26, 1984

[51] Int. Cl.³ .............................................. C03B 5/16
[52] U.S. Cl. ...................................... 65/136; 65/134; 65/135; 65/335; 65/337
[58] Field of Search ................. 65/135, 335, 136, 337, 65/134; 432/180, 181, 182

[56] References Cited

FOREIGN PATENT DOCUMENTS 0071110 9/1983 European Pat. Off. .
2639977 9/1978 Fed. Rep. of Germany .
 887168 1/1962 United Kingdom ................ 432/180
 394984 4/1978 U.S.S.R. .................................. 65/335

*Primary Examiner*—Arthur Kellogg
*Attorney, Agent, or Firm*—John F. A. Earley; John F. A. Earley, III

[57] ABSTRACT

Apparatus for improving oxygen burner performance in a glass furnace having a chamber with a bottom wall connected to a roof wall by side walls, said walls having refractory surfaces, and an opening in the roof wall, comprises a burner for injecting a flame downwardly into the chamber through the roof opening with the flame being adapted to impinge against a bath of molten glass on the bottom wall of the chamber, a hopper for inserting a shower of cullet into the chamber through the roof opening, and a burner spout having a flared end for forming the shower of cullet into a shroud around the flame and for heating the shower of cullet and for forming the cullet into an annular ridge of unmelted cullet on the top surface of the molten glass bath, whereby said ridge deflects the flame upwardly when the flame bounces from the bath of molten glass so that the flame does not bounce horizontally and impinge against the near surface of the side walls, and the shower of cullet shrouds the flame and protects the furnace walls from the radiant energy of the flame and from impingement by the flame, and the cullet picks up heat from the flame before falling onto the bath of molten glass.

10 Claims, 2 Drawing Figures

U.S. Patent  Sep. 3, 1985  4,539,035

METHOD AND APPARATUS FOR IMPROVING OXYGEN BURNER PERFORMANCE IN A GLASS FURNACE

FIELD OF THE INVENTION

This invention relates to glass furnaces, and more particularly concerns glass furnaces which use oxygen burners, and to a method and apparatus for improving the performance of oxygen burners in glass furnaces.

BACKGROUND OF THE INVENTION

Glass furnaces which use oxygen burners are known. These oxygen combustion burners offer advantages such as fuel economy, increased capacity for production, better thermal control, and more efficient means of heat transfer over other means for heating glass furnaces.

However, there are disadvantages to the use of oxygen combustion burners. For example, the radiant energy from such burners may cause damage to refractory surfaces inside the walls of the furnaces if the heat emitted by the burners is too great. Also, the refractory walls of the furnace may be damaged from impingement by the flame of the burner.

SUMMARY OF THE INVENTION

Accordingly, it is an object of this invention to provide a method and apparatus for improving the performance of oxygen burners in glass furnaces, and for overcoming the problems of damage to refractory surfaces caused by radiant energy or by direct impingement of the flame of the burner.

DETAILED DESCRIPTION OF THE DRAWINGS

Figure 1:
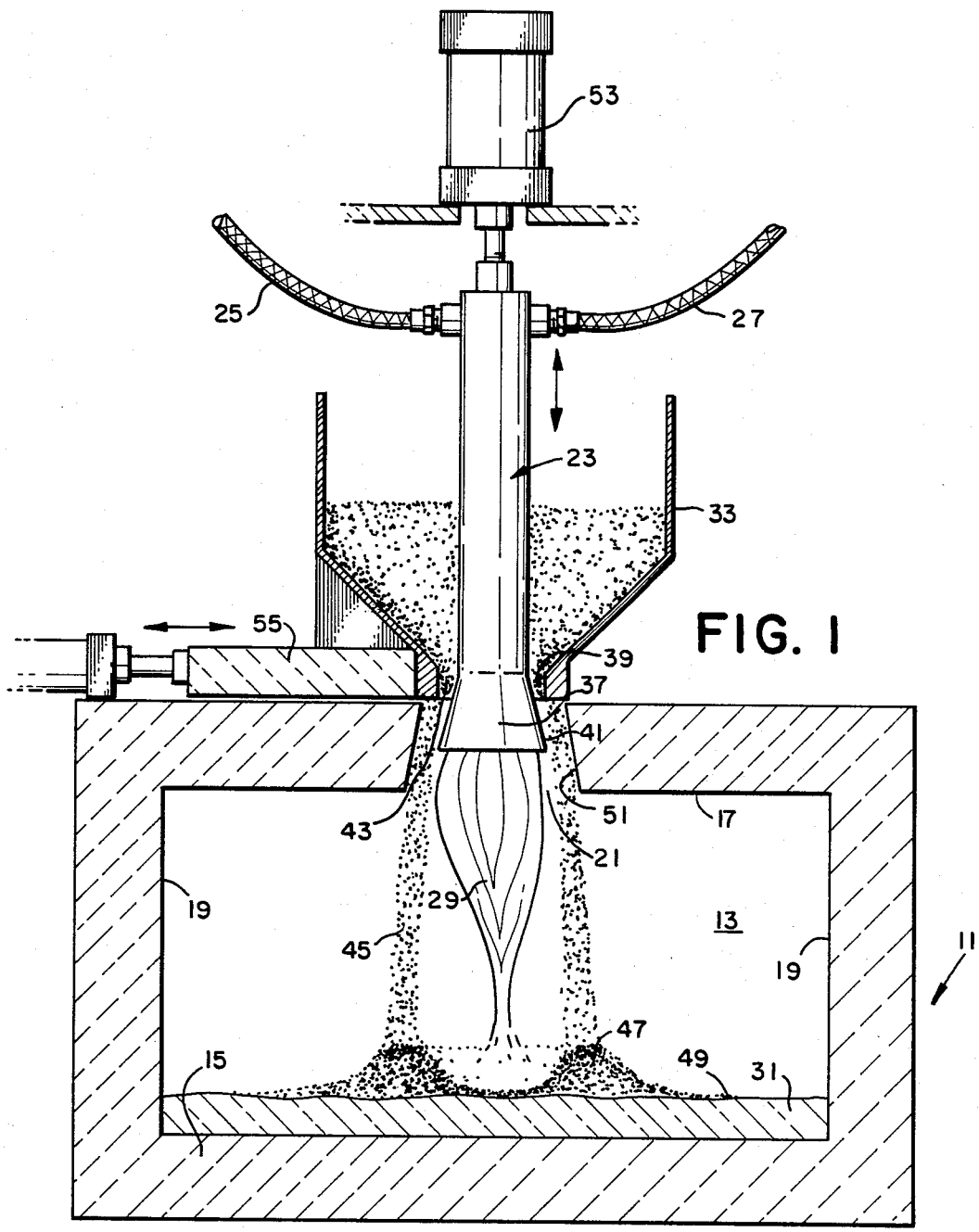
FIG. 1 is a schematic view in elevation and in section of improved oxygen burner apparatus constructed in accordance with this invention.

Turning now to the embodiment of the invention illustrated in FIG. 1 of the drawings, there is shown a glass furnace 11 having a chamber 13 with a bottom wall 15 connected to a roof wall 17 by side walls 19. The walls of the chamber are provided with refractory surfaces; and roof wall 17 is provided with an opening 21.

An oxygen burner 23, which is fed natural gas by flexible line 25 and oxygen by flexible line 27, is provided for injecting a flame 29 downwardly into the chamber 13 through roof opening 21 with the flame 29 being adapted to impinge against a bath 31 of molten glass on the bottom wall 15 of chamber 13.

A hopper 33 is filled with a normal feed stock sand mix called cullet and is mounted above chamber 13. Burner 23 is mounted inside hopper 33 and has a nozzle or spout 37 extending through a hopper opening 39, and is adapted to be mounted above and connected to roof opening 21.

Spout 37 is provided with a flared end 41. When the cullet is directed through an annular opening 43 between flared end 41 and the edge of hopper opening 39, it strikes flared end 41 and forms into a shroud 45 of cullet that surrounds the flame 29. The descending cullet shroud 45 forms into an annular ridge 47 on top surface 49 of the molten glass bath 31.

Ridge 47 deflects the flame 29 upwardly when the flame bounces from the top surface 49 of molten glass bath 31 and prevents the flame from bouncing horizontally and from impinging directly against the near surface of the side walls 19.

The cullet shroud 45 protects the surface of the chamber walls from the radiant energy of flame 29 and from impingement by the flame.

The cullet in shroud 45 also picks up heat from the flame 29 before the cullet falls onto the bath of molten glass to form annular ridge 47 which is of advantage. Ridge 47 has the appearance, somewhat, of the top of a volcano.

Roof opening 21 is provided with a wall 51 that flares outwardly from top to bottom.

Means for controlling cullet flow and for varying the thickness of the wall of the cullet shroud 45, and for varying the thickness of the annular ridge 47 of unmelted cullet on the top surface 49 of molten glass bath 31, is provided and includes the flared end 41 of burner spout 37, which is adapted to be impinged upon by the cullet to spread the cullet into a shroud, and the edge of hopper opening 39 which forms an annular ring or opening 43 with flared end 41. The control means also includes means such as hydraulic cylinder 53 for moving the burner spout 37 upwardly and downwardly in hopper opening 39 to vary the thickness of the annular opening 43 between the flared end 41 of spout 37 and the edge of hopper opening 39.

The process for improving oxygen burner performance in a glass furnace 11 having a chamber 13 with a bottom wall 15 connected to a roof wall 17 by side walls 19, with a roof opening 21, and the walls being provided with refractory surfaces, comprises the steps of providing a bath 31 of molten glass on the bottom wall 15 of the furnace chamber 13, injecting a flame 29 from oxygen burner 23 downwardly into the chamber 13 through the roof opening 21 to impinge against the bath 31 of molten glass and bounce therefrom, inserting a shower of cullet into chamber 13 and forming the shower of cullet into a shroud 45 surrounding the flame 29 to protect the furnace 11 from radiant energy of and impingement by the flame 29, heating the shower of cullet by the flame 29 before the cullet falls onto the bath 31 of molten glass, forming an annular ridge 47 of unmelted cullet on the top surface 49 of the molten glass bath 31, and deflecting the flame 29 upwardly with the ridge 47 when the flame 29 bounces from the bath 31 of molten glass so that the flame 29 does not bounce horizontally and impinge against the near surface of the side walls 19.

The process may include the steps of varying the thickness of the wall of the shroud 45 of cullet, and varying the thickness of the ridge 47 of cullet on the top surface 49 of the molten glass bath 31, as desired, by raising or lowering the burner nozzle or spout 37 in hopper opening 39 to vary the thickness of annular ring 43.

The apparatus may be shut down without heat damage by retracting the burner spout 37 so that it becomes flush with the bottom of hopper 33 and is above the roof wall 17, and then moving the burner apparatus to the side, exposing roof opening 21. A refractory block 55 may be positioned over roof opening 21 to cover the opening.

Compressed air may be passed through the burner 23 to keep the burner cool when the flame 29 is off and the burner is still exposed over roof opening 21.

The BTU input into the glass furnace may be controlled independently of the cullet flow to optimize combustion and minimize any tendency for the flame to impinge on the walls of the furnace chamber 13.

The vertically mounted roof oxygen burner 23, shrouded with a continually falling shroud 45 or shower of cullet (sand mix) provides all the normal advantages of oxygen combustion (fuel economy, increased capacity, thermal control, heat transfer, and so on) while minimizing the problems conventionally associated with oxygen burners in glass furnaces (damage to refractory surfaces on walls due to excessive radiant energy or direct impingement by the flame of the gas burner).

Oxygen burner 23 is an oxygen and gas burner and may be gas cooled or water cooled, and may use any fuel including natural gas, propane, oil, and powdered coal.

Figure 2:
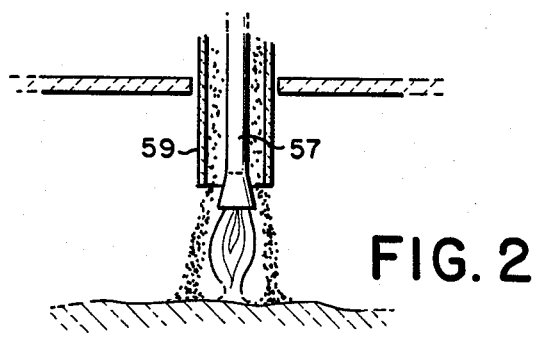
FIG. 2 is a partial view in section of an alternative embodiment of the invention.

The distance from burner spout or nozzle 37 to the volcano surface of annular ridge 47 may be varied to use the shroud 45 and ridge 47 more effectively. As shown in FIG. 2, means for injecting nozzle 37 into chamber 13 is provided and includes a burner nozzle 57 and a ceramic tube 59 which protects the nozzle in the chamber and moves up and down with nozzle 57.

We claim:

1. Apparatus for improving oxygen burner performance in a glass furnace having a chamber with a bottom wall connected to a roof wall by side walls, said walls having refractory surfaces, and an opening in the roof wall, said glass furnace being adapted to have a molten glass bath in the bottom which is adapted to be struck by flame from the burner and to be fed by cullet or the like, comprising burner means for injecting a flame from a nozzle downwardly into a chamber through the roof opening with the flame being adapted to impinge against the bath of molten glass on the bottom wall of the chamber which is at a distance from the nozzle, means for inserting a shower of cullet into the chamber through the roof opening, and means for protecting the walls of the chamber from the radiant energy of the flame and from impingement by the flame, said means controlling the fall of the shower of cullet to form a shroud around the flame and to heat the shower of cullet and to form the cullet into an annular ridge of unmelted cullet on the top surface of the molten glass bath, the distance of the nozzle from the glass bath being sufficient to allow the flame to heat the falling cullet in the shroud, whereby said ridge deflects the flame upwardly when the flame bounces from the bath of molten glass so that the flame does not bounce horizontally and impinge directly against the near surface of the side walls, and the shower of cullet shrouds the flame and protects the furnace walls from the radiant energy of the flame and from impingement by the flame, and the cullet picks up heat from the flame before falling onto the bath of molten glass.

2. The furnace of claim 1,
   said roof opening having a wall which is flared outwardly from top to bottom.

3. The furnace of claim 1,
   the flame injection means being an oxygen and fuel burner.

4. The furnace of claim 1,
   the cullet inserting means being a hopper mounted above the roof opening having a hopper opening which connects with the roof opening.

5. The furnace of claim 1,
   the means for shrouding the flame with the cullet being a burner spout having a flared end positioned below the cullet inserting means and adapted to be impinged upon by the cullet to spread the cullet to form a shroud around the flame.

6. The furnace of claim 1, including
   means for varying the thickness of the wall of the cullet shroud and for varying the thickness of the annular ridge of cullet on the top surface of the molten glass bath.

7. The furnace of claim 6,
   said thickness varying means comprising
   a burner spout having a flared end positioned below an exit opening in a cullet hopper and adapted to be impinged upon by the cullet to spread the cullet into said shroud,
   said flared end of the burner spout forming an annular ring with the edge of the hopper opening,
   and means for moving the burner spout upwardly and downwardly in the hopper opening to vary the thickness of the annular ring between said flared end of the spout and the edge of the hopper opening.

8. Apparatus for improving oxygen burner performance in a glass furnace having a chamber with a bottom wall connected to a roof wall by side walls, said walls having refractory surfaces, and an opening in the roof wall, said glass furnace being adapted to have a molten glass bath in the bottom which is adapted to be struck by flame from the burner and to be fed by cullet or the like, comprising burner means for injecting a flame from a nozzle downwardly into a chamber through the roof opening with the flame being adapted to impinge against the bath of molten glass on the bottom wall of the chamber which is at a distance from the nozzle, p1 means for inserting a shower of cullet into the chamber through the roof opening, and means for protecting the walls of the chamber from the radiant energy of the flame and from impingement by the flame, said means controlling the fall of the shower of cullet to form a shroud around the flame and to heat the shower of cullet and to form the cullet into an annular ridge of unmelted cullet on the top surface of the molten glass bath, the distance of the nozzle from the glass bath being sufficient to allow the flame to heat the falling cullet in the shroud, whereby said ridge deflects the flame upwardly when the flame bounces from the bath of molten glass so that the flame does not bounce horizontally and impinge directly against the near surface of the side walls, and the shower of cullet shrouds the flame and protects the furnace walls from the radiant energy of the flame and from impingement by the flame, and the cullet picks up heat from the flame before falling onto the bath of molten glass, said roof opening having a wall which is flared outwardly from top to bottom, the flame injecting means being an oxygen and gas burner, the cullet inserting means being a hopper mounted above the roof opening having a hopper opening which connects with the roof opening, the means for shrouding the flame with the cullet being a burner spout having a flared end positioned below the cullet inserting means and adapted to be impinged upon by the cullet to spread the cullet to form a shroud around the flame, and means for varying the thickness of the wall of the cullet shroud and for varying the thickness of the annulr ridge of cullet on the top surface of the molten glass bath, said thickness varying means comprising a burner spout having a flared end positioned below an exit opening in a cullet hopper and adapted to be impinged upon by the cullet to spread the cullet into said shroud, said flared end of the burner spout forming an annular ring with the edge of the hopper opening, and means for moving the burner spout upwardly and downwardly in the hopper opening to vary the thickness of the annular ring between said flared end of the spout and the edge of the hopper opening.

9. A process for improving oxygen burner performance in a glass furnace having a chamber with a bottom wall connected to a roof wall by side walls, with an opening in the roof wall, said walls having refractory surfaces, said glass furnace being adapted to have a molten glass bath in the bottom and being adapted to be fed by cullet or the like, comprising providing a bath of molten glass on the bottom wall of the furnace chamber, injecting a flame from a nozzle downwardly into the chamber through the roof opening to impinge against the molten glass, which is at a distance from the nozzle, and bounce therefrom, protecting the furnace walls from radiant energy of and impringement by the flame by controlling the fall of a shower of cullet into the chamber so as to form the shower of cullet into a shroud surrounding the flame and to form an annular ridge of heated unmelted cullet on the top surface of the molten glass bath, heating the shower of cullet while in the shroud by the flame before the cullet falls onto the bath of molten glass, the length of the flame being sufficiently long to heat the cullet in the shroud, and deflecting the flame upwardly with said ridge when the flame bounces from the bath of molten glass so that the flame does not bounce horizontally and impinge against the near surface of the side walls.

10. The process of claim 9, including varying the thickness of the wall of said shroud of cullet and varying the thickness of said ridge of cullet on the top surface of the molten glass bath, as desired.

* * * * *